United States Patent
Engebretsen et al.

(10) Patent No.: US 10,789,259 B2
(45) Date of Patent: Sep. 29, 2020

(54) BROAD MATCH CONTROL

(71) Applicant: Google LLC, Mountain View, CA (US)

(72) Inventors: Lars Engebretsen, Mountain View, CA (US); Jennifer J. Huang, Mountain View, CA (US); Puneet Chopra, Mountain View, CA (US)

(73) Assignee: Google LLC, Mountain View, CA (US)

( * ) Notice: Subject to any disclaimer, the term of this patent is extended or adjusted under 35 U.S.C. 154(b) by 863 days.

(21) Appl. No.: 14/361,637

(22) PCT Filed: Jul. 22, 2013

(86) PCT No.: PCT/SE2013/050924
§ 371 (c)(1),
(2) Date: May 29, 2014

(87) PCT Pub. No.: WO2015/012747
PCT Pub. Date: Jan. 29, 2015

(65) Prior Publication Data
US 2015/0339353 A1    Nov. 26, 2015

(51) Int. Cl.
*G06F 17/30* (2006.01)
*G06F 16/2458* (2019.01)
*G06F 16/951* (2019.01)
*G06Q 30/02* (2012.01)

(52) U.S. Cl.
CPC ........ *G06F 16/2468* (2019.01); *G06F 16/951* (2019.01); *G06Q 30/02* (2013.01)

(58) Field of Classification Search
CPC ..... G06Q 30/0273; G06Q 30/02; G06Q 30/00
See application file for complete search history.

(56) References Cited

U.S. PATENT DOCUMENTS 8,001,152 B1 *  8/2011  Solan .................. G06F 17/2785
                                                            707/791
8,229,925 B2    7/2012  Haugen et al.
                        (Continued)

OTHER PUBLICATIONS

International Search Report and Written Opinion in International Application No. PCT/SE2013/050924, dated Apr. 29, 2014, 13 pages.
(Continued)

*Primary Examiner* — Usmaan Saeed
*Assistant Examiner* — William P Bartlett
(74) *Attorney, Agent, or Firm* — Fish & Richardson P.C.

(57) ABSTRACT

Methods, systems, and apparatus, including computer programs encoded on a computer-readable storage medium, for evaluating a creative. Methods can include identifying one or more selection keywords that are associated with a creative. Matching criteria can be identified for comparing the selection keywords and the request keywords. The matching criteria can be defined by a range from an exact match to a broad match and include a matching threshold in the range. A bid modifier associated with the matching criteria can be established. The bid modifier can modify a bid associated with the creative based on an extent of a match determined between the selection keywords and the request keywords for a given content request. The creative responsive to received content requests can be evaluated based on the matching criteria and the bid modifier.

20 Claims, 6 Drawing Sheets

(56) References Cited

U.S. PATENT DOCUMENTS

| | | | |
|---|---|---|---|
| 2003/0105677 A1* | 6/2003 | Skinner | G06Q 30/02 |
| | | | 705/26.1 |
| 2005/0228797 A1 | 10/2005 | Koningstein et al. | |
| 2006/0095281 A1* | 5/2006 | Chickering | G06Q 30/02 |
| | | | 705/37 |
| 2006/0173744 A1 | 8/2006 | Kandasamy et al. | |
| 2007/0162379 A1 | 7/2007 | Skinner | |
| 2007/0214048 A1 | 9/2007 | Chan et al. | |
| 2007/0233653 A1* | 10/2007 | Biggs | G06Q 30/02 |
| 2008/0059298 A1 | 3/2008 | Waag et al. | |
| 2008/0301093 A1* | 12/2008 | Haugen | G06Q 30/02 |
| 2009/0171929 A1 | 7/2009 | Jing et al. | |
| 2009/0210385 A1* | 8/2009 | Ramaswamy | G06Q 30/02 |
| 2009/0300031 A1* | 12/2009 | Lejano | G01N 1/30 |
| 2010/0208984 A1 | 8/2010 | Bilenko et al. | |
| 2011/0087694 A1* | 4/2011 | Haugen | G06Q 30/02 |
| | | | 707/769 |
| 2012/0166291 A1* | 6/2012 | Broder | G06Q 30/0256 |
| | | | 705/14.71 |
| 2012/0239488 A1 | 9/2012 | Zimmerman et al. | |
| 2014/0164136 A1* | 6/2014 | Posse | G06Q 30/0269 |
| | | | 705/14.66 |

OTHER PUBLICATIONS

Unknown Author, "AdWords Match Types: What Are Keyword Match Types & How Should You Use Them?" WordStream, PPC University, Oct. 14, 2014 [retrieved on Jul. 28, 2015]. Retrieved from the Internet: URL<https://web.archive.org/web/20141014011148/http:/www.wordstream.com/keyword-match-types>, 3 pages.

* cited by examiner

# BROAD MATCH CONTROL

CROSS-REFERENCE TO RELATED APPLICATION

This application is a National Stage Application under 35 U.S.C. § 371 and claims the benefit of International Application No. PCT/SE2013/050924, filed Jul. 22, 2013. The disclosure of the foregoing application is hereby incorporated by reference in its entirety.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for evaluating a creative. The method comprises: identifying one or more selection keywords that are associated with a creative, the selection keywords used in determining when the creative is shown in response to received content requests that include one or more request keywords; identifying matching criteria for comparing the selection keywords and the request keywords, the matching criteria defined by a range from an exact match to a broad match, and wherein the matching criteria includes a matching threshold in the range; establishing a bid modifier that is associated with the matching criteria, the bid modifier modifying a bid associated with the creative based on an extent of a match that is determined between the selection keywords and the request keywords for a given content request; and evaluating the creative responsive to received content requests based at least in part on the matching criteria and the bid modifier.

These and other implementations can each optionally include one or more of the following features. Identifying the matching criteria can include suggesting a matching criteria for a content sponsor associated with the creative. Identifying the matching criteria can include enabling selection of matching criteria from an entire portion of the range by a content sponsor associated with the creative. Enabling selection of matching criteria can include presenting an interface to a content sponsor associated with the creative. The interface can include a control for specifying matching criteria in the range. The control can be a sliding scale. Establishing the bid modifier can include automatically selecting the bid modifier for a content sponsor associated with the creative. Establishing the bid modifier can include enabling selection of the bid modifier by a content sponsor associated with the creative. Enabling selection of the bid modifier can include presenting an interface to the content sponsor associated with the creative. The interface can include a control for adjusting the bid modifier over the range. The control can enable selection of different bid modifiers for different portions of the range. The control can enable selection of a function to define an adjustment of the bid modifier over the range. A selection of matching criteria in the range can be received. A selection of a bid modifier to be associated with the received selection of the matching criteria can be received. A plurality of bid modifiers to be applied to different matching criteria over the range can be established. One of the plurality of bid modifiers can be applied for a given request based on an extent of match between the selection keywords and request keywords for the given request. A request for content can be received where the request includes one or more request keywords. The request keywords can be compared to the selection keywords associated with the creative. An extent of a match can be determined based on the comparison. A determination can be made that the matching criteria is satisfied based on the extent and, when so, the bid modifier can be used in evaluating whether to serve the creative responsive to the request. The creative can be an advertisement.

In general, another aspect of the subject matter described in this specification can be implemented in computer program products. A computer program product tangibly embodied in a computer-readable storage device comprises instructions. The instructions, when executed by a processor, cause the processor to: identify one or more selection keywords that are associated with a creative, the selection keywords used in determining when the creative is shown in response to received content requests that include one or more request keywords; identify matching criteria for comparing the selection keywords and the request keywords, the matching criteria defined by a range from an exact match to a broad match and including a matching threshold in the range, wherein the identifying includes presenting an interface to a content sponsor associated with the creative, the interface including a first control for specifying the matching threshold; establish a bid modifier that is associated with the matching criteria, the bid modifier modifying a bid associated with the creative based on an extent of a match that is determined between the selection keywords and the request keywords for a given content request, wherein the establishing includes enabling selection of the bid modifier by the content sponsor using a second control included in the interface; and evaluate the creative responsive to received content requests based at least in part on the matching criteria and the bid modifier.

These and other implementations can each optionally include one or more of the following features. Identifying the matching criteria can include providing a suggestion for the matching criteria to the content sponsor. The first control can be a sliding scale. Establishing the bid modifier can include automatically selecting the bid modifier for the content sponsor. The second control can enable selection of different bid modifiers for different portions of the range. The second control can enable selection of a function to define an adjustment of the bid modifier over the range. The creative can be an advertisement.

In general, another aspect of the subject matter described in this specification can be implemented in systems. A system comprises one or more processors and one or more memory elements including instructions. The instructions, when executed, cause the one or more processors to: identify one or more selection keywords that are associated with a creative, the selection keywords used in determining when the creative is shown in response to received content requests that include one or more request keywords; identify matching criteria for comparing the selection keywords and the request keywords, the matching criteria defined by a range from an exact match to a broad match, and wherein the matching criteria includes a matching threshold in the range; establish a bid modifier that is associated with the matching criteria, the bid modifier modifying a bid associated with the creative based on an extent of a match that is determined between the selection keywords and the request keywords for a given content request; and evaluate the creative responsive to received content requests based at least in part on the matching criteria and the bid modifier.

These and other implementations can each optionally include one or more of the following features. Identifying the matching criteria can include suggesting a matching criteria for a content sponsor associated with the creative. Identifying the matching criteria can include enabling selection of matching criteria from an entire portion of the range by a content sponsor associated with the creative. Enabling selection of matching criteria can include presenting an interface to a content sponsor associated with the creative. The interface can include a control for specifying matching criteria in the range. The control can be a sliding scale. Establishing the bid modifier can include automatically selecting the bid modifier for a content sponsor associated with the creative. Establishing the bid modifier can include enabling selection of the bid modifier by a content sponsor associated with the creative. Enabling selection of the bid modifier can include presenting an interface to the content sponsor associated with the creative. The interface can include a control for adjusting the bid modifier over the range.

Particular implementations may realize none, one or more of the following advantages. A content sponsor can, for a content item, configure matching criteria and corresponding bids at various levels of broadness. A content sponsor can associate multiple bids with a selection keyword for a content item at various levels of broadness while specifying the selection keyword once rather than multiple times for the content item.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

One or more selection criteria (e.g., keywords) associated with a creative can be used in determining when the creative is shown in response to requests for content. The requests for content can include one or more request criteria (e.g., or request keywords). A content sponsor can identify matching criteria for comparing the selection criteria (e.g., keywords) and the request criteria (e.g., keywords), such as by designating a matching threshold in a range defined, for example, from an exact match to a broad match. For example, the content sponsor can use a slider control or some other type of control to designate the matching threshold. The content sponsor can also establish (e.g., define) a bid modifier that is associated with the matching criteria designation, where the bid modifier modifies a bid associated with the creative based on a designated modifier and an extent of a match that is determined between the selection criteria and the request criteria for a given request. A content management system, in response to a request for content, can evaluate the creative based at least in part on the matching criteria and the bid modifier, to determine whether the creative is selected to be served in response to the request.

Figure 1:
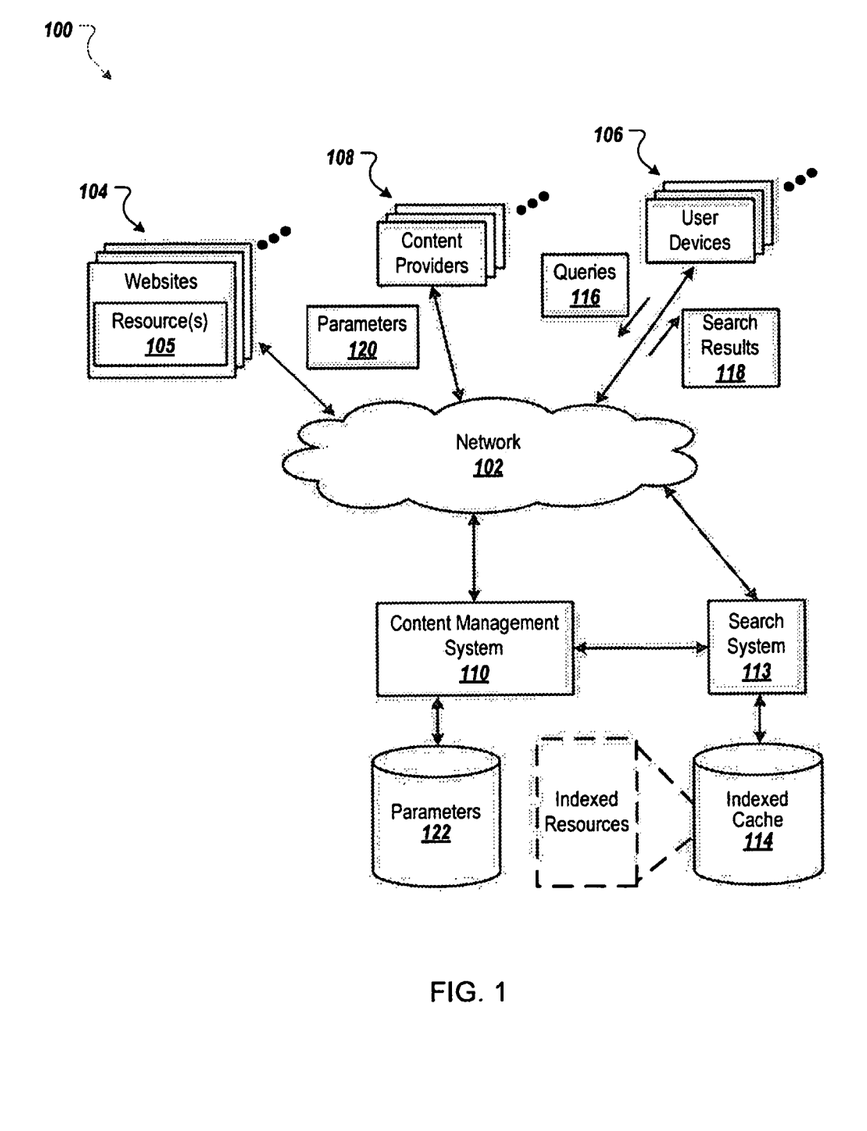
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. A request for content can be received by the content management system 110 from a user device 106, such as in association with a request for a resource 105. The content management system 110 can select one or more content items to provide in response to the request. For example, the request for content can include characteristics (e.g., size, supported media types) of one or more content "slots" that are defined for the requested resource 105 or a search results page. As another example, resource keywords associated with a requested resource 105 or a search query 117 can be provided to the content management system 110.

Content items selected by the content management system 110 can include content items having characteristics or selection criteria matching the characteristics of content slots and that are identified as relevant to specified request criteria (such as resource keywords or search queries 117). For example, content items having keywords that match the resource keywords or the search query 117 can be selected by the content management system 110. The content management system 110 can also select content items at least in part based on the results of an auction. The content management system 110 can provide one or more selected content items to the requesting user device 106, for presentation on the user device 106.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

In some implementations, some content providers 108 prefer that the number of impressions allocated to their content and the price paid for the number of impressions be more predictable than the predictability provided by an auction. For example, a content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and one or more selection terms.

The parameters 120 can also include matching criteria for comparing the selection criteria (e.g., keywords) to request criteria (e.g., keywords) associated with a request for content. In some implementations, a selection keyword can be associated with one or match types. Match types can include, for example, exact match, near-exact match, phrase match, near-phrase match, broad match modifier, and broad match. Other match types are possible. A request keyword can match a broad match keyword, for example, if the request keyword includes some or all of the words included in the broad match keyword, in any order. In some implementations, the request keyword can also include words other than the words included in the broad match keyword. In some implementations, a request keyword can also match a broad match keyword if the request keyword includes singular or plural forms, synonyms, and other relevant variations of one or more words included in the broad match keyword. A broad match modifier is a modifier that can be applied to a word included in a broad match keyword to indicate that for a match to occur the word needs to be included in the request keywords as, for example, an exact match or a close variant of the word, where close variants include misspellings, singular/plural forms, abbreviations and acronyms, and stemmings.

In some implementations, a request keyword can match a phrase match keyword if the request keyword includes at least the phrase match keyword as an exact phrase, with the words of the phrase in the request keyword being in the same order as the words in the phrase match keyword. In some implementations, the request keyword can match the phrase match keyword if the request keyword includes words other than the phrase match keyword. A near-phrase match keyword is similar to a phrase match keyword with a difference being that with a near-phrase match keyword, a match between the request keyword and the near-phrase match keyword can occur, for example, if the request keyword includes at least the near-phrase match keyword as an exact phrase or as a close variant of the exact phrase. In some implementations, a request keyword can match an exact match keyword if the request keyword exactly matches the exact match keyword and does not include any other words other than the exact match keyword. A near-exact match keyword is similar to an exact match keyword except that with a near-exact match keyword a match can occur, for example, if the request keyword is a close variant of the near-exact keyword.

The options for various match types can be sufficient for some or all content providers 108. However, to define desired matching criteria, some content providers may be required to enter selection keywords multiple times with a different match type and bid for each instance of the selection keyword. If a campaign includes a large number of selection keywords, creating and maintaining multiple instances of some or all selection keywords can be difficult and time consuming. As another example, some content providers 108 can desire to have more refined control for matching a request keyword to a selection keyword than is offered by a set of discrete match types, such as for fine-tuning selection of a matching criteria to provide a desired return of investment. In addition; some content providers 108 may wish to vary their bids based on the match type without necessarily any other change to the selection criteria.

In some implementations, for example, a matching criteria can be identified (e.g., defined) by a content provider 108 by a range from an exact match to a broad match. Defining the matching criteria can include, for example, designating a matching threshold in the range. For example, the account management user interface can include a user interface element (e.g., a sliding scale) for specifying matching criteria in a range. As described in more detail below, the parameters 120 can also include a bid modifier for each selection keyword, where a bid modifier is associated with a matching criteria designation and modifies a bid associated with a creative based on a modifier and an extent of a match that is determined between the selection keyword associated with the bid modifier and request keywords associated with a given request.

Figure 2:
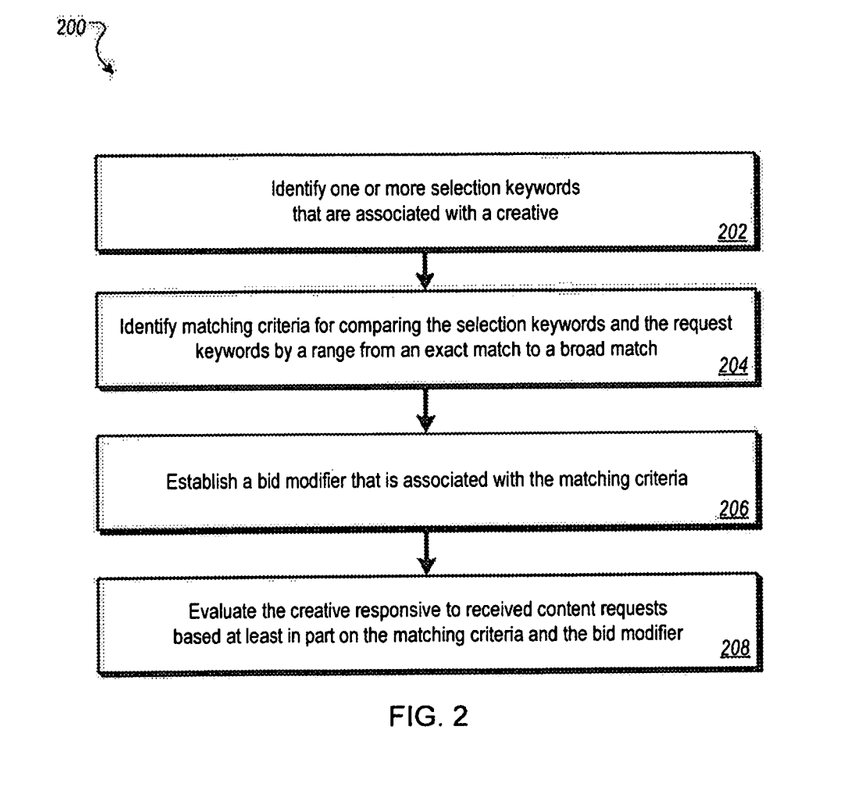
FIG. 2 is a flowchart of an example process for evaluating a creative.

FIG. 2 is a flowchart of an example process 200 for evaluating a creative. The process 200 can be performed, for example, by the content management system 110 described above with respect to FIG. 1.

One or more selection keywords that are associated with a creative are identified (202). The selection keywords can be used in determining when the creative is shown in response to requests that are received for content where the requests for content include one or more request keywords. The creative can be, for example, an advertisement or some other type of content. The selection keywords can be identified, for example, in response to a content sponsor specifying the selection keywords on a campaign management user interface.

Matching criteria for comparing the selection keywords and the request keywords are identified (204). For example, the matching criteria can be defined by a range, for example, from an exact match to a broad match. Identifying the matching criteria can include, for example, receiving a designation of a matching threshold in the range. For example, one or more user interface controls can be presented to a content sponsor associated with the creative on the campaign management user interface. The user interface controls can include, for example, a sliding scale for specifying matching criteria in the range.

Figure 3A:
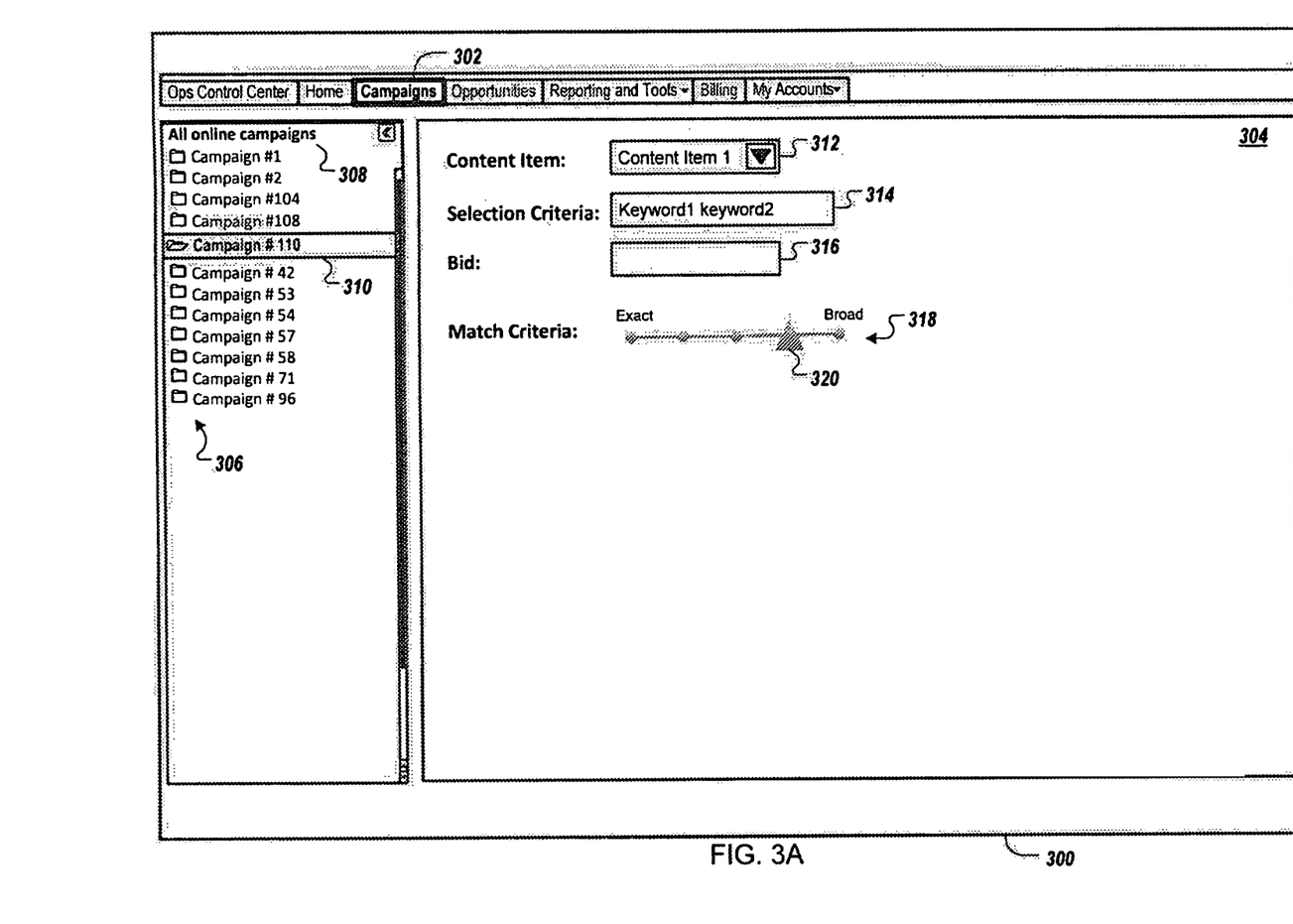
FIG. 3A illustrates an example campaign management user interface.

For example, FIG. 3A illustrates an example campaign management user interface 300. The user interface 300 can be included, for example, in one or more user interfaces that a user, such as a campaign sponsor, can use to configure a campaign. The sponsor can select a tab 302 to display a campaign configuration area 304. The sponsor can view a list 306 of campaigns by selecting a control 308. The sponsor can edit an existing campaign in the campaign configuration area 304 by selecting the name of an existing campaign (e.g., a name 310) in the campaign list 306. The sponsor can select a content item for the campaign using a control 312. Selection criteria and a bid for the selected content item can be specified using controls 314 and 316, respectively.

The sponsor can use a slider control 318 to configure matching criteria for the entered selection criteria. The matching criteria can be defined by a range, for example, from an exact match to a broad match. The sponsor can select and move a control 320 to a position on the slider control 318 to designate a matching threshold in the range. When evaluating received requests for content, a content management system can compare request keywords to the selection criteria specified by the sponsor, and can identify the content item as a candidate content item if the request keywords match the selection criteria at the level of exactness indicated by the control 320 or, in some implementations, at a more exact level.

Figure 3B:
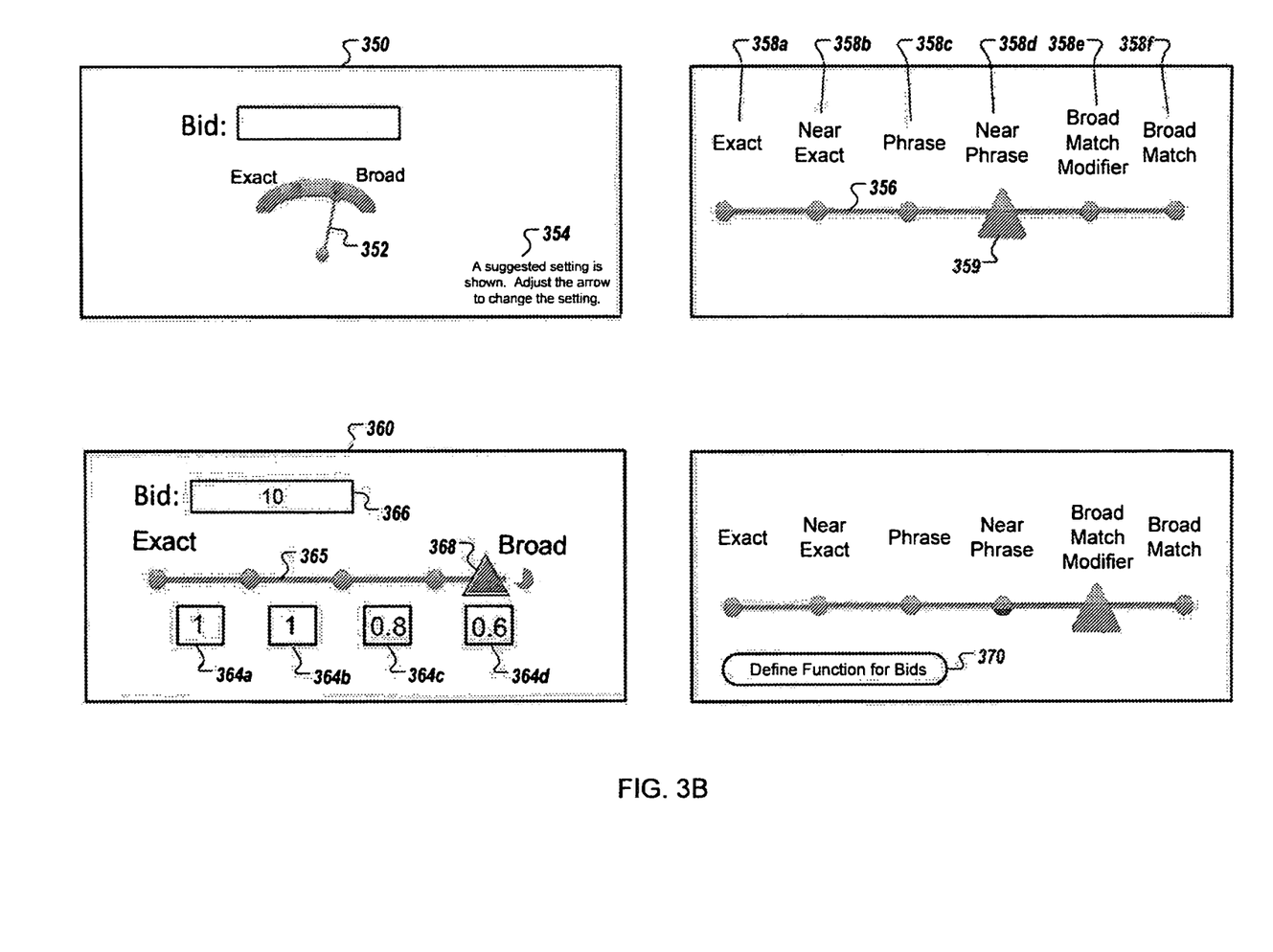
FIG. 3B illustrates example user interface controls.

Other types of controls can be used to define matching criteria. For example, FIG. 3B illustrates an example group 350 of user interface controls that includes a dial control 352 that defines a range from an exact match to a broad match. The sponsor can adjust the dial control 352 to designate a matching threshold in the range. In some implementations, when first configuring particular selection criteria, a suggestion 354 for a matching criteria setting can be displayed to the sponsor. The sponsor can either accept or adjust the suggested setting. The suggestion 354 can be determined, for example, from historical performance information for the sponsor or from sponsors similar to the sponsor (e.g., peer content providers in a same vertical as the sponsor). Performance information can also be presented to a user upon selection. That is, in order to ensure that a proper level is selected, performance at a given level can be presented to the user so as to enable for an adjustment to be made as required.

As another example, as shown for a slider control 356, match type labels 358a-f can be displayed at various points of the range defined by the slider control 356, to aid the sponsor in selecting a particular threshold. For example, the labels 358a-f and corresponding points on the slider control 356 correspond to match types of exact match, near-exact match, phrase match, near-phrase match, broad match modifier, and broad match, respectively. The sponsor may be familiar with such match types and can select a position on the slider control 356 based on an understanding of the match types. The sponsor can move a control 359 to a particular point corresponding to one of the labels 358a-f or to a position on the slider control 356 that is between two of the points 358a-f. When positioned between the two discrete levels, a modified or custom match can be defined, for example, based on a percentage of match or based on other intermediary criteria between the two fixed levels.

In some implementations, in addition to or instead of the labels 358a-f, an example selection keyword can be displayed along with example request keywords that would match the selection keyword at various levels of broadness. In some implementations, other information can be displayed that is related to a current setting of the control 259. For example, predicted statistics such as impressions, conversions, costs, and other information can be displayed that are estimated based on a current match threshold corresponding to the control 259. The predicted statistics can change as the user moves the control 259.

Referring again to FIG. 2, a bid modifier that is associated with the matching criteria designation is established (206). The bid modifier modifies a bid associated with the creative based on an extent of a match that is determined between the selection keywords and the request keywords for a given request. The bid modifier can be defined, for example, with information received from a content sponsor through a user interface.

For example, as shown in FIG. 3B, a group 360 of user interface controls can be presented to the sponsor. Bid modifier fields 364a-d can be displayed along with a slider control 365. The sponsor can enter a bid modifier into a respective bid modifier field 364a-d, to configure a modification to a bid entered using a bid control 366. A particular bid modifier can be applied, for example, if a selection keyword matches a request keyword at a level of exactness corresponding to the bid modifier. For example, a bid modifier of 0.6 (e.g., corresponding to the bid modifier field 364d) can be applied to the bid of ten entered using the bid control 366 (e.g., creating a modified bid of six) if the selection keyword matches the request keyword at a level of exactness corresponding to a control 368 positioned on the slider 365 (e.g., an exactness level slightly less than broad match). In some implementations, the sponsor can enter one or more specific, particular bids (e.g., rather than bid modifier(s)), corresponding to one or more levels of exactness.

In some implementations, default bid modifiers are presented in the bid modifier fields 364a-d and the sponsor can either accept or adjust the default bid modifiers. In some implementations, such as corresponding to an advanced operation mode, the sponsor is enabled to select or define a function which defines bid modifier values over the matching criteria range. For example, the sponsor can select a control 370, which can result in the display of a function selection/definition interface (not shown in FIG. 3B).

Referring again to FIG. 2, the creative is evaluated responsive to received content requests based at least in part on the matching criteria and the bid modifier (208). For example, the creative can be evaluated as described below in process 400.

Figure 4:
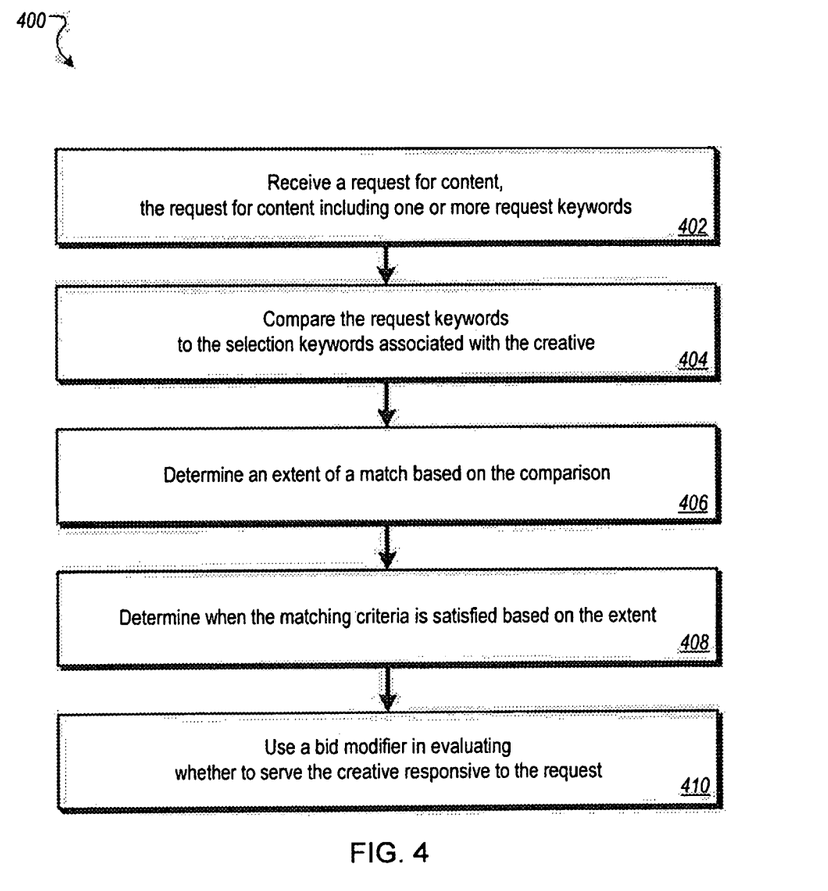
FIG. 4 is a flowchart of an example process for evaluating a creative.

FIG. 4 is a flowchart of an example process 400 for evaluating a creative. The process 400 can be performed, for example, by the content management system 110 described above with respect to FIG. 1.

A request for content including one or more request keywords is received (402). For example, a request for content for one or more content slots can be received from a user device. The request keywords can, for example, be keywords associated with a resource from whence the request originated or with a search query.

The request keywords are compared to selection keywords associated with the creative (404) and an extent of a match is determined based on the comparison (406). For example, in some implementations, the extent of match is a determined semantic-relevance score which estimates a semantic difference between the request keywords and the selection keywords. In some implementations, machine-learning systems and scoring models are used to determine the extent of match. In some implementations; an ROI (Return on Investment)-based score is used to determine the extent of match, such as by comparing a predicted interaction rate (e.g., predicted click through rate (PCTR)) associated with the request keywords to a predicted interaction rate associated with the selection keywords. In some implementations, a keyword match score based on a model trained using human evaluators can be used to determine the extent of match, where the keyword match score indicates how closely a request keyword is to a particular selection keyword.

A determination is made that the matching criteria is satisfied based on the extent (408). For example, the matching criteria can be defined by a range from an exact match to a broad match and a sponsor-provided matching threshold in the range can be identified. The matching threshold can be, for example, a numerical value within the range of zero to one hundred, where zero represents an exact match and one hundred represents a broad match. For instance, an example sponsor-provided matching threshold can be forty percent. The extent of match can be compared to the matching threshold. If the extent of match is equal to or greater than the matching threshold, a determination can be made that the matching criteria is satisfied. For example, the matching criteria can be satisfied when the extent of match is forty one percent and the matching threshold is forty percent.

A bid modifier is used in evaluating whether to serve the creative responsive to the request (410). For example, a bid modifier associated with the extent of match can be determined and can be applied to a bid associated with the creative. For example, the bid can be ten and the determined bid modifier can be 0.8. In such an example, application of the bid modifier to the bid can result in a modified bid of eight. An auction can be performed with the creative and other creatives, with the modified bid being used for the creative. The creative can be served responsive to the request, for example, if the creative has a highest bid or a highest auction score (e.g., a score that is computed as a function of a bid and/or a quality measure or other factors).

Figure 5:
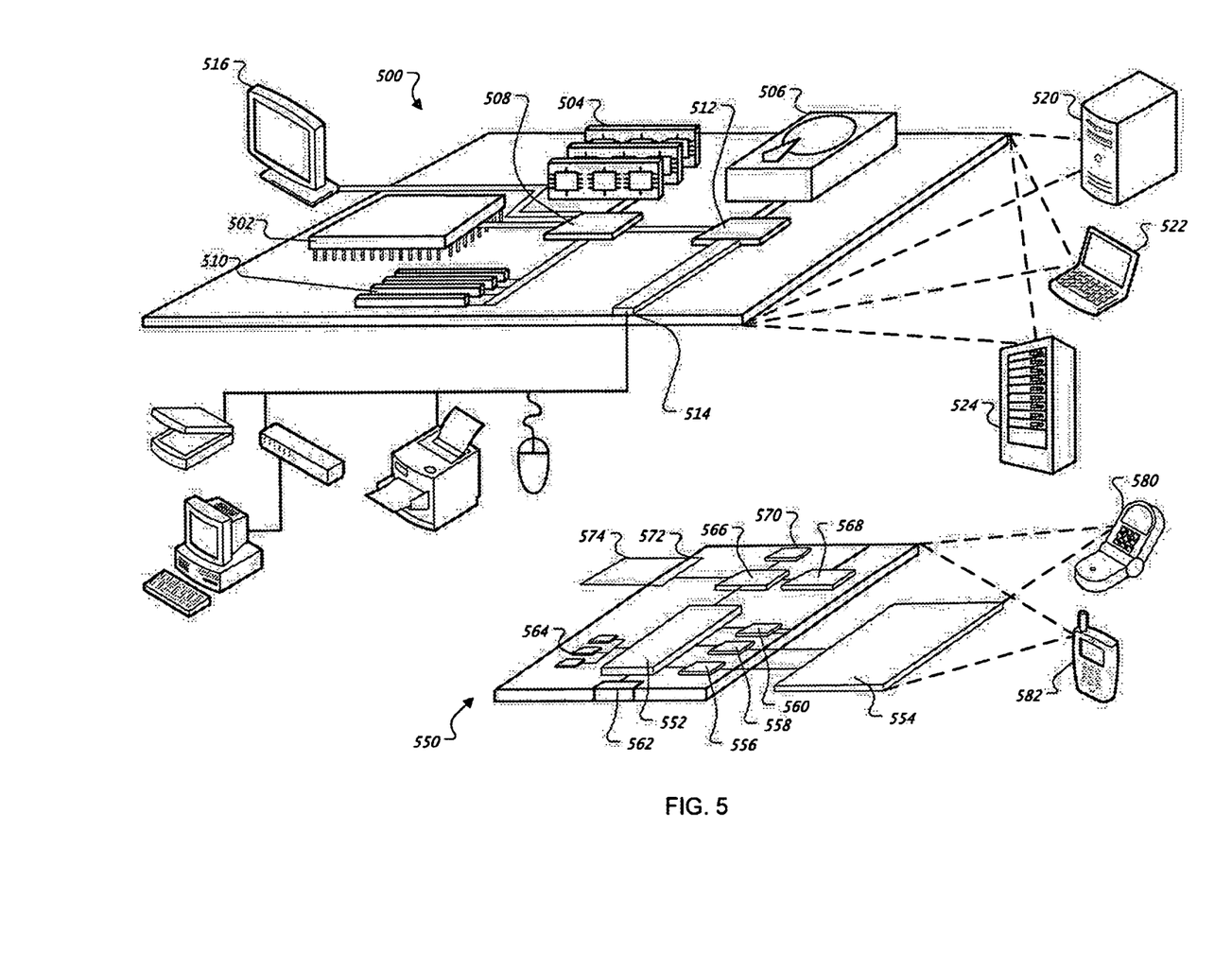
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
identifying a selection keyword and single corresponding bid that is used in determining when a creative is shown in response to received content requests that include one or more request keywords;
obtaining, by one or more computers, a given matching criterion for comparing the selection keyword and the one or more request keywords, the given matching criterion being obtained from a continuous range of matching criteria defined by a continuous range from an exact match to a broad match, wherein each matching criterion in the continuous range has a corresponding matching threshold, including:
enabling, by the one or more computers, selection of a matching criterion by a content sponsor that provides the creative, including presenting an interface to the content sponsor that includes a control for selecting, from the continuous range of matching criteria, the given matching criterion;
presenting, in the interface, performance information indicating a historical performance of the creative when presented according to each of the matching criteria, including changing the performance information presented as the control is moved along the continuous range of matching criteria to present the performance information for a particular matching criterion corresponding to the location of the control on the continuous range of matching criterion; and
receiving, through the interface, a selection of the given matching criterion from among the continuous range of matching criteria, wherein the selected matching criterion has a corresponding historical performance and a lower matching threshold than at least a second matching criterion in the matching criteria;
establishing different bid modifiers for a single instance of the selection keyword, the different bid modifiers being respectively associated with different levels in the continuous range of matching criteria including at least the given matching criterion and the second matching criterion, each of the different bid modifiers modifying the single corresponding bid for the selection keyword based on a level of match that is determined to exist between the selection keyword and the one or more request keywords for a given content request being within the range that corresponds to the level of match for the different bid modifier; and receiving a request for content that includes at least one request keyword;

determining, based on a comparison of the received at least one request keyword and the selection keyword, a given level of match between the received at least one request keyword and the selection keyword;

in response to determining the given level of match, identifying, based on the given level of match, that one of the given matching criterion and the second matching criterion is satisfied by the given level of match meeting the corresponding matching thresholds of the given matching criterion and the second matching criterion;

identifying, from among the different bid modifiers for the given matching criterion and the second matching criterion, a given bid modifier that was established for the one of the given matching criterion and the second matching criterion that is satisfied by the given level of match; and evaluating the creative for distribution responsive to the received content request based on an adjusted bid that is determined based on application of the given bid modifier to the single corresponding bid.

2. The method of claim 1 wherein presenting, in the interface, includes presenting a matching criterion suggestion for a content sponsor associated with the creative.

3. The method of claim 1 wherein the control is a sliding scale.

4. The method of claim 1 wherein establishing the different bid modifiers includes automatically selecting the bid modifiers for a content sponsor associated with the creative.

5. The method of claim 1 wherein establishing the different bid modifiers further includes enabling selection of the different bid modifiers by a content sponsor associated with the creative.

6. The method of claim 4, wherein enabling selection of the different bid modifiers includes presenting an interface to the content sponsor associated with the creative, the interface including a bid modifier control that enables selection of different bid modifiers for different portions of the range.

7. The method of claim 6 wherein the bid modifier control enables selection of a function to define the different bid modifiers over the range.

8. The method of claim 1 wherein the creative is an advertisement.

9. One or more non-transitory computer-readable media comprising instructions that, when executed by a processor, cause the processor to:

identify a selection keyword and single corresponding bid that is used in determining when a creative is shown in response to received content requests that include one or more request keywords;

obtain, by one or more computers, a given matching criterion for comparing the selection keyword and the one or more request keywords, the given matching criterion being obtained from a continuous range of matching criteria defined by a continuous range from an exact match to a broad match, wherein each matching criterion in the continuous range has a corresponding matching threshold, including:

enabling, by the one or more computers, selection of a matching criterion by a content sponsor that provides the creative, including presenting an interface to the content sponsor that includes a control for selecting, from the continuous range of matching criteria, the given matching criterion;

presenting, in the interface, performance information indicating a historical performance of the creative when presented according to each of the matching criteria, including changing the performance information presented as the control is moved along the continuous range of matching criteria to present the performance information for a particular matching criterion corresponding to the location of the control on the continuous range of matching criterion; and receiving, through the interface, a selection of the given matching criterion from among the continuous range of matching criteria, wherein the selected matching criterion has a corresponding historical performance and a lower matching threshold than at least a second matching criterion in the matching criteria;

establish different bid modifiers for a single instance of the selection keyword, the different bid modifiers being respectively associated with different levels in the continuous range of matching criteria including at least the given matching criterion and the second matching criterion, each of the different bid modifiers modifying the single corresponding bid for the selection keyword based on a level of match that is determined to exist between the selection keyword and the one or more request keywords for a given content request being within the range that corresponds to the level of match for the different bid modifier; and receive a request for content that includes at least one request keyword;

determine, based on a comparison of the received at least one request keyword and the selection keyword, a given level of match between the received at least one request keyword and the selection keyword;

in response to determining the given level of match, identify, based on the given level of match, that one of the given matching criterion and the second matching criterion is satisfied by the given level of match meeting the corresponding matching thresholds of the given matching criterion and the second matching criterion;

identify, from among the different bid modifiers for the given matching criterion and the second matching criterion, a given bid modifier that was established for the one of the given matching criterion and the second matching criterion that is satisfied by the given level of match; and evaluate the creative for distribution responsive to the received content request based on an adjusted bid that is determined based on application of the given bid modifier to the single corresponding bid.

10. The computer-readable media of claim 9 wherein presenting, in the interface, includes presenting a matching criterion suggestion for a content sponsor associated with the creative.

11. The computer-readable media of claim 9 wherein establishing the different bid modifiers includes automatically selecting the bid modifiers for the content sponsor.

12. The computer-readable media of claim 9 wherein establishing the different bid modifiers includes presenting an interface to the content sponsor associated with the creative, the interface including a bid modifier control that enables selection of different bid modifiers for different portions of the range.

13. The computer-readable media of claim 12 wherein the bid modifier control enables selection of a function to define the different bid modifiers over the range.

14. The computer-readable media of claim 9 wherein the creative is an advertisement.

15. A system comprising:
one or more processors; and
one or more memory elements including instructions that when executed cause the one or more processors to:
identify a selection keyword and single corresponding bid that is used in determining when a creative is shown in response to received content requests that include one or more request keywords;
obtain, by one or more computers, a given matching criterion for comparing the selection keyword and the one or more request keywords, the given matching criterion being obtained from a continuous range of matching criteria defined by a continuous range from an exact match to a broad match, wherein each matching criterion in the continuous range has a corresponding matching threshold, including:
enabling, by the one or more computers, selection of a matching criterion by a content sponsor that provides the creative, including presenting an interface to the content sponsor that includes a control for selecting, from the continuous range of matching criteria, the given matching criterion;
presenting, in the interface, performance information indicating a historical performance of the creative when presented according to each of the matching criteria, including changing the performance information presented as the control is moved along the continuous range of matching criteria to present the performance information for a particular matching criterion corresponding to the location of the control on the continuous range of matching criterion; and
receiving, through the interface, a selection of the given matching criterion from among the continuous range of matching criteria, wherein the selected matching criterion has a corresponding historical performance and a lower matching threshold than at least a second matching criterion in the matching criteria;
establish different bid modifiers for a single instance of the selection keyword, the different bid modifiers being respectively associated with different levels in the continuous range of matching criteria including at least the given matching criterion and the second matching criterion, each of the different bid modifiers modifying the single corresponding bid for the selection keyword based on a level of match that is determined to exist between the selection keyword and the one or more request keywords for a given content request being within the range that corresponds to the level of match for the different bid modifier; and
receive a request for content that includes at least one request keyword;
determine, based on a comparison of the received at least one request keyword and the selection keyword, a given level of match between the received at least one request keyword and the selection keyword;
in response to determining the given level of match, identify, based on the given level of match, that one of the given matching criterion and the second matching criterion is satisfied by the given level of match meeting the corresponding matching thresholds of the given matching criterion and the second matching criterion;
identify, from among the different bid modifiers for the given matching criterion and the second matching criterion, a given bid modifier that was established for the one of the given matching criterion and the second matching criterion that is satisfied by the given level of match; and
evaluate the creative for distribution responsive to the received content request based on an adjusted bid that is determined based on application of the given bid modifier to the single corresponding bid.

16. The system of claim 15 wherein presenting the interface includes presenting a matching criterion suggestion for a content sponsor associated with the creative.

17. The system of claim 15 wherein the control is a sliding scale.

18. The system of claim 15 wherein establishing the different bid modifiers includes automatically selecting the different bid modifiers for a content sponsor associated with the creative.

19. The system of claim 15 wherein establishing the different bid modifiers further includes enabling selection of the different bid modifiers by a content sponsor associated with the creative.

20. The system of claim 19 wherein enabling selection of the different bid modifiers includes presenting an interface to the content sponsor associated with the creative, the interface including a control that enables selection of different bid modifiers for different portions of the range.

* * * * *

UNITED STATES PATENT AND TRADEMARK OFFICE
CERTIFICATE OF CORRECTION

PATENT NO. : 10,789,259 B2
APPLICATION NO. : 14/361637
DATED : September 29, 2020
INVENTOR(S) : Engebretsen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*